No. 869,385. PATENTED OCT. 29, 1907.
J. F. OLLRICH.
SUCTION DREDGE CUTTER.
APPLICATION FILED JAN. 28, 1907.
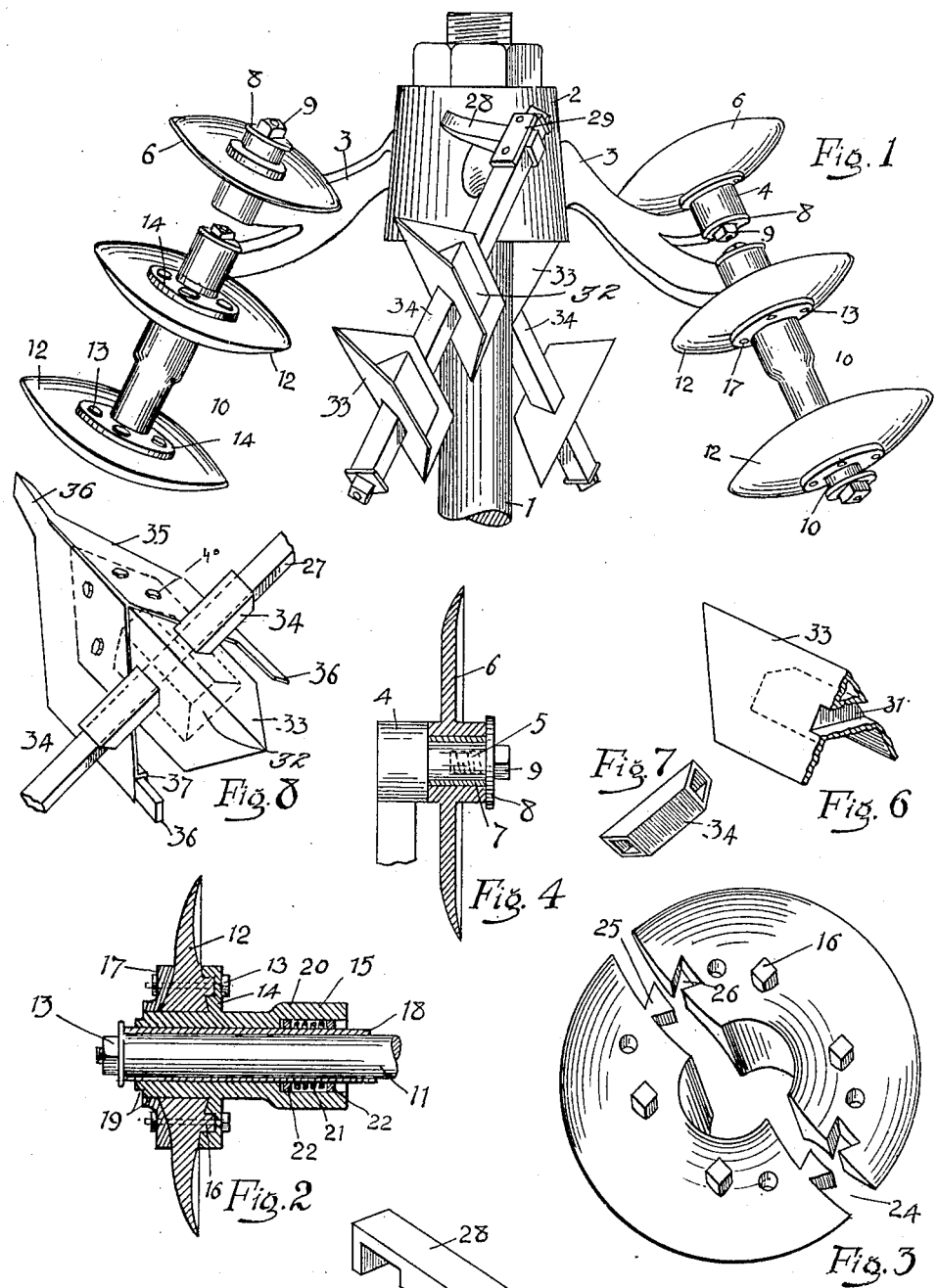
Witnesses:
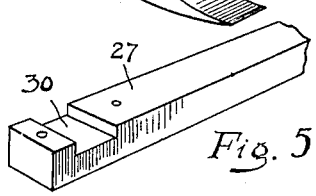
Inventor.
J. F. Ollrich,
By F. M. Wright
Attorney.

UNITED STATES PATENT OFFICE.

JOHN F. OLLRICH, OF SAN FRANCISCO, CALIFORNIA.

SUCTION-DREDGE CUTTER.

No. 869,385.  Specification of Letters Patent.  Patented Oct. 29, 1907.

Application filed January 28, 1907. Serial No. 354,592.

*To all whom it may concern:*

Be it known that I, JOHN F. OLLRICH, a citizen of the United States, residing at San Francisco, in the county of San Francisco and State of California, have invented new and useful Improvements in Suction-Dredge Cutters, of which the following is a specification.

This invention relates to improvements in cutters for suction dredges, the object of the invention being to provide an improved cutter which shall be more efficient in operation and more durable in use, than those heretofore employed.

In the accompanying drawing, Figure 1 is a broken plan view of my improved cutter; Fig. 2 is an axial section of one of the cutter disks; Fig. 3 is a perspective view of a modified form of the disk; Fig. 4 is a sectional view of the terminal disk; Fig. 5 is a detail perspective view of a tooth and a part of the bar adjacent thereto; Fig. 6 is a broken perspective view of a plow-shaped cutter; Fig. 7 is a perspective view of a spacing collar; Fig. 8 is a perspective view of a modification of the plow-shaped cutter.

Referring to the drawing, 1 indicates a shaft upon which is secured a hub 2 having radiating arms 3. Alternate arms are branched at the outer ends, as shown, and the front branches 4 carry spindles 5 on which are rotatably mounted the terminal cutter disks 6, rotating on bushings 7 and secured in place by the washers 8 and tap bolts 9. From each rear branch 10 extends obliquely outwards and rearwards a round bar or shaft 11, on which are carried a plurality of cutter disks 12, two such disks being here shown on each arm, although the number may be varied. Each disk 12 is secured by bolts 13 to a flange 14 extending out from a sleeve 15, the disk having lugs 16 engaging sockets in the flange, an annular plate 17 being also bolted on the outside of the disk. The sleeve 15 rotates on a bushing 18 on the shaft 11, and is reduced at one end, as shown at 19, and enlarged at the other end, as shown at 20, to receive the reduced end 19 of the next adjacent sleeve, a spring 21 and rings 22 being also contained in said enlarged end and acting to press the sleeves apart. In the modification shown in Fig. 3, the disk is made in two sections 24 separated diametrally, this form of disk rendering it unnecessary to remove the other disks from the bar when substituting any disk for one injured or worn out. These sections are held together by means of dovetailed lugs 25 and recesses 26 in the two sections. The other arms 3 carry square bars 27 extending obliquely outwards and rearwards from the bars. The front end of each bar carries a tooth 28 which is held by a plate 29 in a recess 30 formed in the end of said bar. The main or rear portion of said bar is reduced in size and passes through apertures 31 in the bridges 32 of the plow-shaped cutters 33, spacing collars 34 being interposed between said cutters.

In the modification shown in Fig. 8, cutter plates 35 are by means of screws 40 removably secured on the plow-shaped castings 33. These plates are formed with tongues 36 at diagonally opposite corners, which tongues cut into the ground and facilitate the action of the plow-shaped cutters. It is desirable that the tongues or points 36 be detachable, so that when worn out by constant friction with the ground, they can be replaced by new ones, and I have shown one corner of one of the plates 35 formed with a socket 37 to receive a tongue or point.

A great advantage is obtained by arranging the disk-shaped cutters and the plow-shaped cutters to follow one another in their revolution about the cutter shaft, as the action of each complements and assists that of the other.

I claim:—

1. A suction dredge cutter comprising a shaft, arms radiating therefrom, bars extending outwards obliquely from the ends of said arms, and disk-shaped cutters and plow-shaped cutters carried by alternate bars, substantially as described.

2. A suction dredge cutter comprising a shaft, arms radiating therefrom, bars extending outwards from the ends of said arms, and disk-shaped cutters on said bars, substantially as described.

3. A suction dredge cutter comprising a shaft, arms radiating therefrom, bars extending outwards obliquely from the ends of said arms, and plow-shaped cutters on said bars, substantially as described.

4. A suction dredge cutter comprising a shaft, a bar supported thereby, a sleeve on the bar having a flange, and a cutter detachably secured to the flange, substantially as described.

5. A suction dredge cutter comprising a shaft, a bar supported thereby, and a plow-shaped cutter having an apertured bridge, said bar passing through said aperture, and a spacing sleeve on said bar, substantially as described.

6. A suction dredge cutter comprising a shaft, a bar supported thereby, a plow-shaped cutter on said bar, having a socket, and a tongue or point removably secured in said socket, substantially as described.

In testimony whereof I have hereunto set my hand in the presence of two subscribing witnesses.

JOHN F. OLLRICH.

Witnesses:
 FRANCIS M. WRIGHT,
 D. B. RICHARDS.